May 9, 1944. E. G. CLEVERLY 2,348,608
TERMINAL CONNECTING GRIP FOR BALLOON FLYING AND OTHER CABLES
Filed Nov. 7, 1942
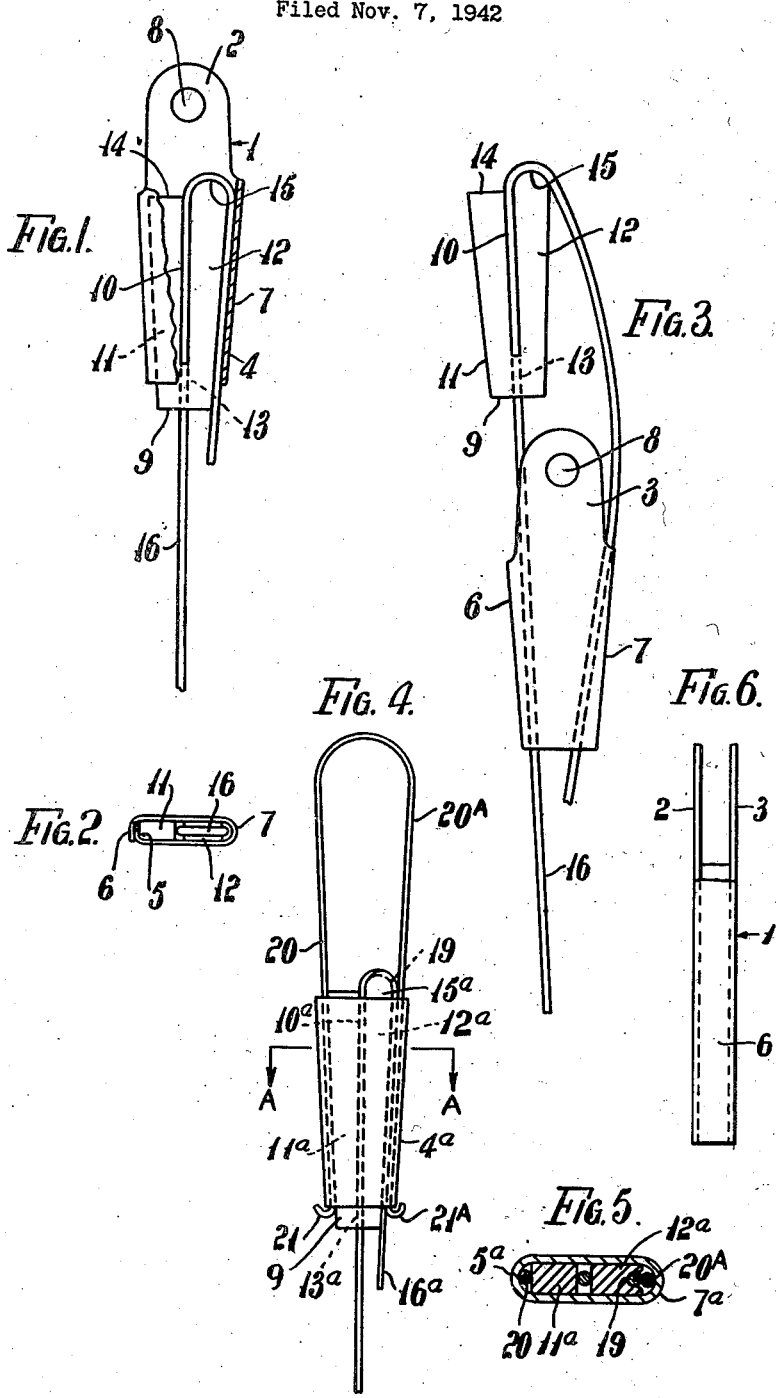

UNITED STATES PATENT OFFICE 2,348,608

TERMINAL CONNECTING GRIP FOR BALLOON FLYING AND OTHER CABLES

Edwin George Cleverly, Cardington, Bedford, England

Application November 7, 1942, Serial No. 464,911
In Great Britain October 8, 1941

5 Claims. (Cl. 24—126)

This invention relates to terminal connecting grips for cables or wires, of the type comprising a wedge member, a sheath providing a tapered socket or housing in which the wedge member is housed, when the wedge member and sheath are assembled, and means in the wedge member for receiving part of the terminal portion of the wire or cable which is to be attached to the connecting grip, the wedge member and sheath being so constructed and their dimensions so related that the drag applied to the wire or cable acts to pull the wedge member into locking engagement with the sheath and to cause the said part of the terminal portion of the wire or cable arranged in the said means to be gripped so firmly by the wedge member that the wire or cable cannot be disengaged from the terminal connecting grip as long as the drag on the wire or cable is maintained, the grip exerted on the wire or cable progressively increasing as the drag on the wire or cable is progressively increased.

One object of the invention is to provide improved means of gripping and connecting the end portion of a wire or cable to the point of attachment of a balloon or kite or to any other terminal, without soldering and with the least possible recourse to tools.

Another object is to provide a terminal connecting grip of the type referred to, comprising a tapered wedge member which is split or divided longitudinally over part of its length so as to provide opposed relatively movable jaws between which part of the terminal portion of the wire or cable is arranged, a sheath comprising a tapered socket or housing for the wedge member of a width which is greater than the width of the wedge member, so that when the wedge member is in its operative position within the sheath and one lateral edge of the wedge member is fitted against the adjacent surface of the said socket, the other lateral edge of the wedge member is spaced from the surface of the socket adjacent to it, means in said wedge member whereby the terminal portion of the wire or cable may be arranged longitudinally in said member with part thereof disposed between the said opposed jaws of the wedge member, the end of the said terminal portion of the wire or cable which projects from the wider end of the wedge member beyond the said opposed jaws being folded back around one of said jaws at the wider end of the wedge member towards the narrower end of the wedge member, and arranged between that lateral edge of the wedge member which is spaced from the adjacent surface of the said socket and this surface, the said terminal portion thus being formed as a loop, one limb of which is firmly gripped between the said opposed jaws of the wedge member and the other limb between the wedge member and the adjacent surface of the said socket when the wedge member is pulled into a locking position in the sheath by drag applied to the wire or cable. The taper of the wedge member is usually greater than that of the said socket, so that the grip exerted on the wire or cable by the said opposed jaws of the wedge member is greatest at the wider end of the wedge member and decreases progressively from the wider end to the narrower end of the wedge member. For larger terminal connecting grips however, the taper of the wedge member may be the same as that of the socket.

A modified construction as shown in Figs. 4 and 5 is provided with a wire loop for the suspension or attachment of the connecting grip, the two limbs of the loop passing through the sheath and the ends of the limbs being hooked back around the narrower end of the sheath. In this construction, instead of fitting directly against the adjacent surface of the socket one lateral edge of the wedge member fits against one limb of the said loop, while that part of the wire or cable which is bent around the rounded end of the longer jaw of the wedge member and is passed through the sheath fits against one side of the other limb of the said loop, the opposite side of which limb fits against the adjacent surface of the socket.

Constructional forms of the invention are shown, by way of example, on the accompanying sheet of drawings, whereon:

Fig. 1 is an elevation of one form of terminal connecting grip with part of the sheath broken away;

Fig. 2 is a top plan view corresponding to Fig. 1;

Fig. 3 is a view showing the method of engaging the wedge within the sheath;

Fig. 4 is an elevation of a modified construction of grip provided with a holding loop whereby the grip may be suspended from, or attached to another member;

Fig. 5 is a section to an enlarged scale on the line A—A in Fig. 4;

Fig. 6 is an edge elevation of the sheath.

Referring to Figs. 1 to 3:

The terminal connecting grip shown in these figures comprises a fairly heavy gauge sheet metal sheath member 1 having two spaced lugs 2 and 3 and a sheath 4, which is substantially rectangular in cross section and is tapered downwardly. The sheath is formed by folding the metal as shown in Fig. 2 and by overlapping the turned over end wall 5 by the adjacent turned-over wall 6, the opposite end wall 7 being curved. The walls 5 and 6 are secured together as by brazing or welding. The sheath 4 is asymmetrical about the longitudinal centre line of the wedge for a reason to be referred to hereinafter. The top shoulder of the wall 5, 6 is lower than the top shoulder of the wall 7. The lugs 2 and 3 are formed with coaxial holes 8, for the reception of a pin whereby the grip may be suspended from or attached to another member.

The wedge 9 is tapered and is symmetrical about its longitudinal centre line and is formed with a central slit 10, which extends from the top of the wedge 9 to a point spaced from the bottom of the wedge and thus forms the latter into two limbs 11 and 12. The slit connects with a drilled aperture or passage 13, and the latter, the slit and the holes 8 are aligned. The limb 11 is formed with a square shoulder 14 and the limb 12 is formed with a rounded shoulder 15. The taper of the wedge is greater than that of the side walls 5 and 7 of the sheath for a purpose to be referred to hereinafter.

Referring to Fig. 2, it will be seen that the diameter of the wire 16 is less than the thickness of the wedge. As shown in Fig. 3, in assembling the grip the terminal portion of the wire is threaded through the sheath 4 and then through the passage or aperture 13 and the slit 10, the alignment of the aperture or passage being such that the wire lies substantially centrally in the slit and within the opposed front and rear faces of the two limbs 11 and 12. The length of wire which protrudes from the slit is turned over and around the curved shoulder of the limb 12, the free end of the wire then being threaded through the sheath 4 as shown in Fig. 3. It is then only necessary to enter the wedge in the sheath and pull downwardly on the wire 16 in order to pull the wedge fully into the sheath and the part of the wire laid in and around it into position in the sheath.

The operative positions of the wedge and sheath are shown in Figs. 1 and 2, wherein it will be seen that the terminal portion of the wire is held between the outer side of the limb 12 and the inner surface of the curved side wall 7 of the sheath 4. As mentioned above, the taper of the wedge is greater than that of the sheath with the result that the gripping pressure applied to the wire by the limbs 11 and 12, which are forced towards each other when the wedge is pulled downwards in the sheath, is greatest at the upper end of the slit 10. This ensures that the wire is gripped tightly at the top of the wedge and that the gripping pressure decreases progressively down the length of the wedge until the wire is released from pressure at a point near the junction of the aperture and slit. It will be understood that the greater the pull on the wire, the sheath being anchored, the tighter will be the grip of the wedge limbs upon the wire. As mentioned above, the shoulder at the top of the side wall 7 of the sheath is higher than the shoulder at the top of the opposite side wall 5, 6 and as the limb 11 of the wedge is shorter than the limb 12 and the shoulder 14 is square, the user should have no difficulty in fitting the wedge right way round in the sheath.

Figs. 4 and 5 show a modified terminal connecting grip in which a continuous groove 19 is formed in the rounded end 15a of the limb 12a and in the side edge of the limb and of the wedge adjacent to the side wall of the sheath. Before the grip is assembled, however, the limbs 20 and 20A of a loop of wire are inserted into the sheath 4a and their ends are turned outwards and upwards as shown as 21 and 21A. The wire 16a is threaded through the aperture or passage or hole 13a and the slit 10a, but in this case it is engaged after being turned back in the continuous groove 19 with part lying inside the right hand limb 20A of the loop. Thus drag applied to the wire 16 not only results in the wire being gripped between the limbs 11a and 12a of the wedge but also in the limb 20 of the loop being gripped between the left hand edge of the limb 11a and the inside of the side wall 5a of the sheath. The other limb 20A is gripped between the length of the wire 16a lying in the groove 19 and the side wall 7a of the sheath.

I claim:

1. A terminal connecting grip used in connection with a cable, comprising a tapered sheath, and a wedge member movably engaging in said sheath, said member being split for a substantial portion of the length thereof to thereby provide an opposed pair of cable gripping jaws, said wedge member having an opening extending from the base of the split to the outer edge of the wedge whereby the cable may be threaded therethrough and in between the said jaws for gripping engagement by the latter.

2. A terminal connecting grip used in connection with a cable, comprising a tapered sheath, and a wedge member movably engaging in said sheath, said member being split for a substantial portion of the length thereof to thereby provide an opposed pair of cable gripping jaws, one of said jaws being longer than the other jaw and formed with a rounded end over which the cable is adapted to engage.

3. A terminal connecting grip used in connection with a cable, comprising a tapered sheath, a wedge member movably engaging in said sheath, said wedge member including a pair of confronting cable gripping jaws, and a substantially U-shaped connecting member having the opposite legs thereof disposed between the outer inclined sides of said wedge and said sheath, said connecting member including outturned end portions engaging the reduced end of said sheath, pulling strain on the cable gripped between said jaws effecting a gripping of said connecting member between the outer sides of said jaws and said sheath.

4. A terminal connecting grip used in connection with a cable including a tapered sheath, and a wedge member movably engaging in said sheath, said member being partially split to provide a pair of opposed cable gripping jaws, said member provided with a passageway through which the free end of the cable is passed for disposing the cable between the said jaws, the said free end of the cable after being passed through said passageway being adapted to be bent back over one of said jaws and returned through the sheath along one side of the wedge to the narrow end of the sheath to thereby retain the cable in gripped position.

5. In a terminal connecting grip of the type referred to for use in connection with a cable or wire, a tapered sheath, and a tapered wedge member movably engaging in said sheath, said member formed with a longitudinal slit extending from its wider end toward its narrower end, but terminating short of the narrower end so as to provide two opposed relatively movable jaws, the width of the space between the inner edges of said jaws being slightly larger than the diameter of the cable or wire which is to be passed therebetween, and a hole formed longitudinally in said wedge member between the narrower end thereof and the inner end of said slit, whereby the terminal portion of the cable or wire to be gripped may be threaded through said hole from the narrower end of the wedge, arranged between the said jaws and then bent back and returned through the sheath along one side of the wedge to the narrow end of the sheath.

EDWIN GEORGE CLEVERLY.